(12) United States Patent
Lee et al.

(10) Patent No.: US 7,684,002 B2
(45) Date of Patent: Mar. 23, 2010

(54) LIQUID CRYSTAL DISPLAY DEVICE AND FABRICATING THE SAME

(75) Inventors: Young Seop Lee, Paju-si (KR); Hong Seok Jang, Gwangju-si (KR); Hyun Jin Kim, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 399 days.

(21) Appl. No.: 11/606,293

(22) Filed: Nov. 30, 2006

(65) Prior Publication Data

US 2007/0132937 A1    Jun. 14, 2007

(30) Foreign Application Priority Data

Dec. 13, 2005    (KR)    ...................... 10-2005-0122481

(51) Int. Cl.
     *G02F 1/1339*    (2006.01)
(52) U.S. Cl. ........................ 349/156; 349/155; 349/157
(58) Field of Classification Search .......... 349/155–157
See application file for complete search history.

(56) References Cited

U.S. PATENT DOCUMENTS

| | | | |
|---|---|---|---|
| 7,253,868 B2* | 8/2007 | Lee et al. | ..................... 349/155 |
| 7,304,712 B2* | 12/2007 | Sawasaki et al. | ............ 349/156 |
| 2004/0183991 A1* | 9/2004 | Kuo | ........................... 349/155 |
| 2006/0103803 A1* | 5/2006 | Jeon et al. | .................... 349/155 |

FOREIGN PATENT DOCUMENTS

| | | |
|---|---|---|
| CN | 1274092 | 11/2000 |
| CN | 1605907 | 4/2005 |
| CN | 1637528 | 7/2005 |
| JP | 2005-242297 | 9/2005 |
| JP | 2005-316375 | 11/2005 |

* cited by examiner

*Primary Examiner*—Hemang Sanghavi
(74) *Attorney, Agent, or Firm*—McKenna Long & Aldridge

(57) ABSTRACT

A liquid crystal display (LCD) device includes first and second substrates facing each other; a plurality of step portions on the first substrate; a plurality of first column spacers on the second substrate, the first column spacers contacting the step portions wherein an upper surface of the first column spacer is larger than a contact area between the first column spacer and the step portion; a plurality of second column spacers on the second substrate, the second column spacers spaced apart from the first substrate, wherein a first contact area between the first column spacers and the second substrate is smaller than a second contact area between the second column spacers and the second substrate; and a liquid crystal layer between the first and second substrates.

20 Claims, 14 Drawing Sheets

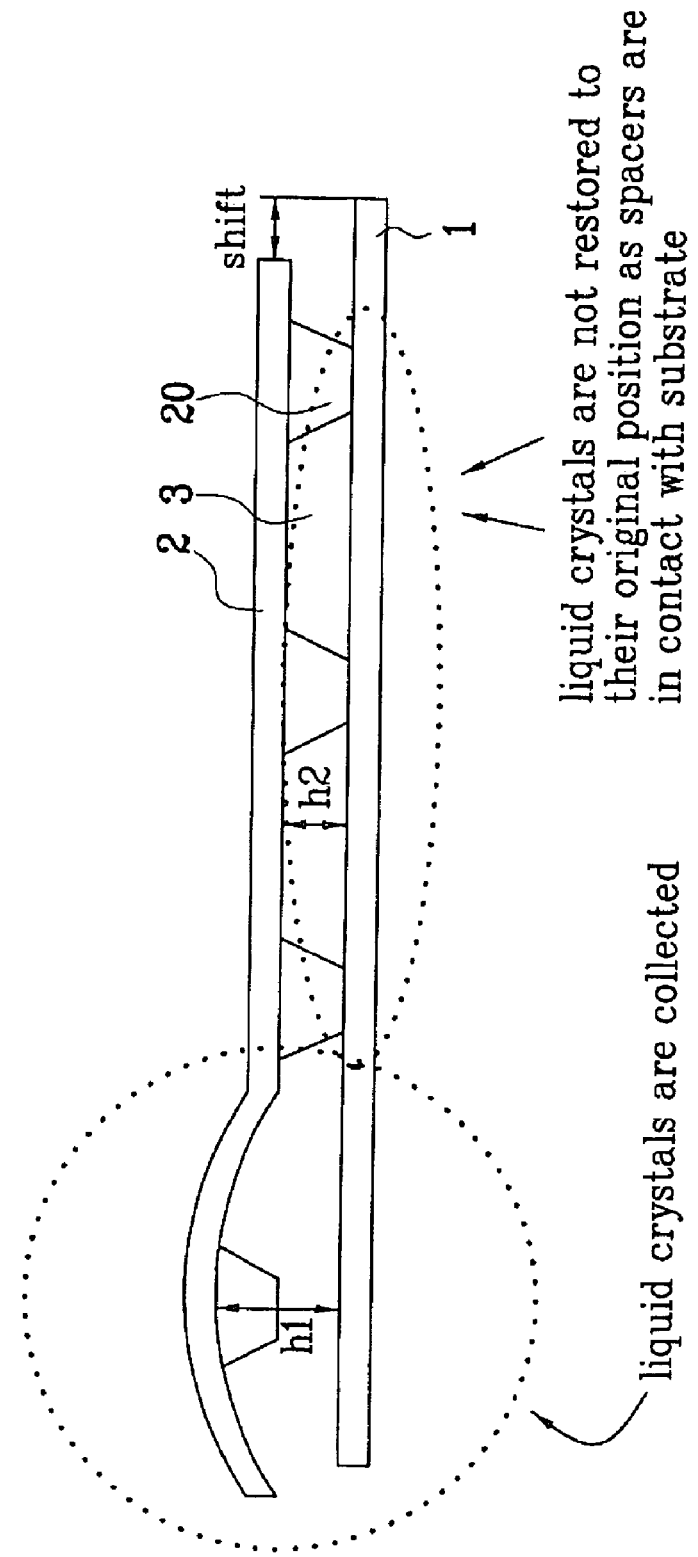

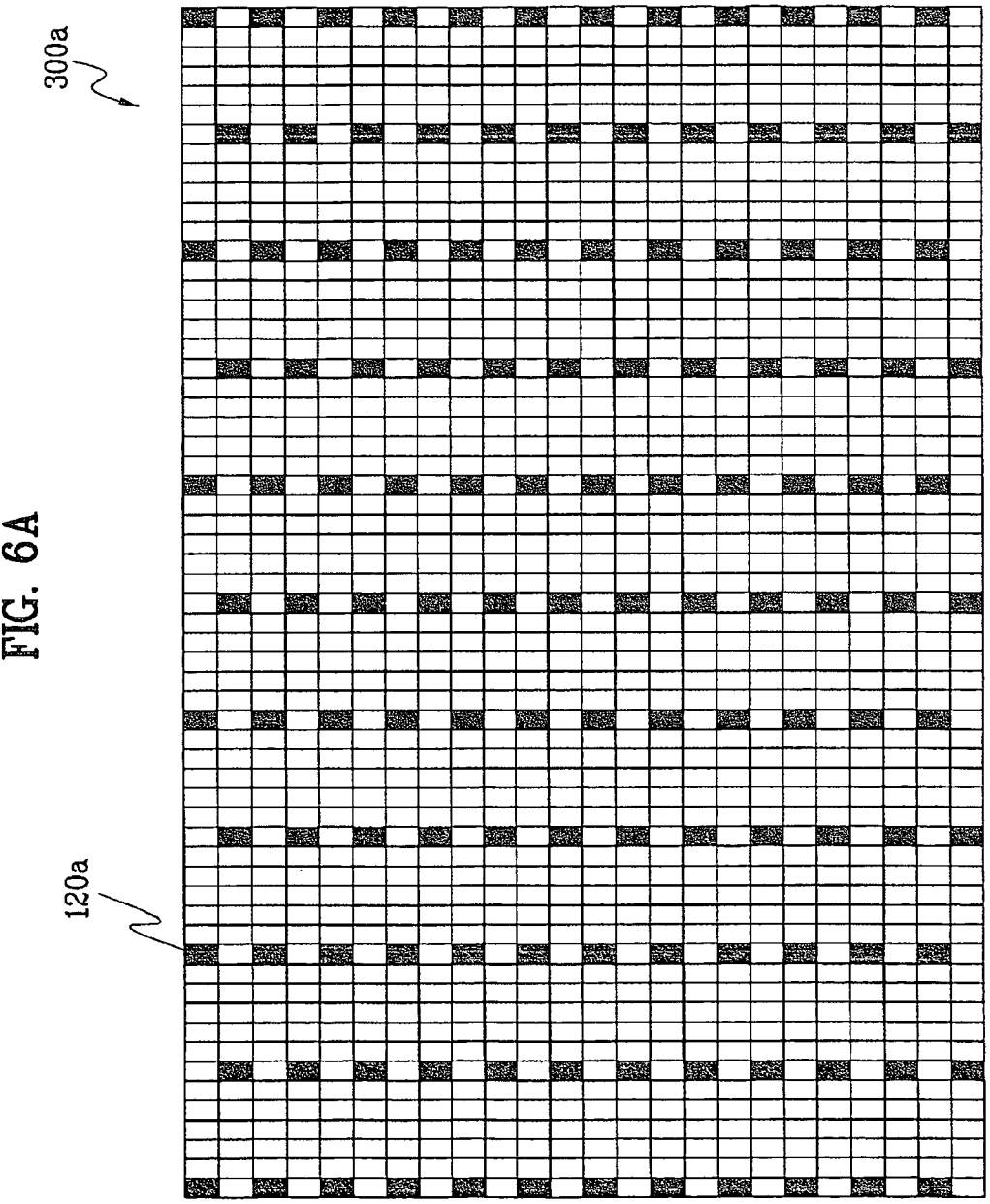

LIQUID CRYSTAL DISPLAY DEVICE AND FABRICATING THE SAME

This application claims the benefit of the Korean Patent Application No. P2005-0122481, filed on Dec. 13, 2005, which is hereby incorporated by reference as if fully set forth herein.

BACKGROUND OF THE INVENTION

1. Field of the Invention

The present invention relates to a liquid crystal display (LCD) device, and more particularly, to an LCD device having a column spacer and method for fabricating the same.

2. Discussion of the Related Art

Demands for various display devices have increased with development of an information society. Accordingly, many efforts have been made to research and develop various flat display devices such as liquid crystal display (LCD) devices, plasma display panels (PDPs), electroluminescent displays (ELDs), and vacuum fluorescent displays (VFDs). Some of the flat display devices have already been applied to displays for various equipments.

Among the various flat display devices, liquid crystal display (LCD) devices have been most widely used due to their advantageous characteristics such as thin profile, lightweight and low power consumption, and thus are substituting for Cathode Ray Tubes (CRTs). In addition to mobile type LCD devices such as LCD devices for notebook computers, LCD devices have been developed for computer monitors and televisions to receive display broadcasting signals.

In order to use LCD devices in various fields as a general display, LCD devices should offer a high quality picture, such as a high resolution and high luminance with a large-sized screen, while still maintaining such characteristics as lightweight, thin profile and low power consumption.

A general LCD device includes first and second substrates bonded to each other with a certain space, and a liquid crystal layer formed between the first and second substrates.

The first substrate includes a plurality of gate lines arranged along a first direction at fixed intervals and a plurality of data lines arranged along a second direction perpendicular to the first direction at fixed intervals. A plurality of pixel regions are defined by the gate and data lines. A plurality of pixel electrodes are arranged within the pixel regions. A plurality of thin film transistors are formed at regions where the gate lines cross the data lines and apply data signals of the data lines to the pixel electrodes in accordance with signals applied to the gate lines.

Also, the second substrate includes a black matrix layer for preventing a light leakage from portions of the first substrate except at the pixel regions, R/G/B color filter layers for displaying various colors, and a common electrode for producing images on the color filter layers.

The liquid crystal layer is formed between the first and second substrates. The molecules of the liquid crystal layer are driven by an electric field generated between the pixel electrode and the common electrode. Light passing through the liquid crystal layer is controlled by the alignment direction of the molecules of the liquid crystal layer, thereby displaying images. This type of LCD device is referred to as a twisted nematic (TN) mode LCD device, which has disadvantageous characteristics such as a narrow viewing angle. In order to overcome the narrow viewing angle, an in-plane switching (IPS) mode LCD device has been developed.

In the IPS mode LCD device, a pixel electrode and a common electrode are formed on the first substrate in parallel to each other at a fixed interval, so that the pixel electrode and the common electrode generate an IPS mode electric field (horizontal electric field) that aligns the molecules of the liquid crystal layer.

Meanwhile, a plurality of spacers are formed between the first and second substrates of the aforementioned LCD devices to maintain a constant cell gap for the liquid crystal layer. The spacers may be ball spacers or column spacers.

The ball spacers have a spherical shape and are dispersed on either the first or second substrates. Also, the ball spacers are relatively free in their movements even after the first and second substrates are bonded to each other. The ball spacers have a small contact area with the first and second substrates.

By contrast, the column spacers are formed by an array process on the first substrate or the second substrate. The column spacers are formed on a predetermined substrate in a column shape with a predetermined height. Therefore, the column spacers have a relatively large contact area with the first and second substrates.

FIG. 1 is a sectional view illustrating an LCD device provided with a plurality of column spacers according to the related art.

Referring to FIG. 1, the LCD device provided with a plurality of column spacers includes first and second substrates 30 and 40 opposing each other, a column spacer 20 formed between the first and second substrates 30 and 40, and a liquid crystal layer (not shown) filled between the first and second substrates 30 and 40. The column spacer 20 is located corresponding to a predetermined position of the gate line 31.

The first substrate 30 includes a gate line 31 crossing a data line (not shown) to define a pixel region, a thin film transistor TFT formed on a region where the gate line 31 crosses the data line, and a pixel electrode (not shown) formed in each pixel region. The first substrate 30 further includes a gate insulating layer 36 formed on the entire surface including the gate line 31 and a passivation layer 37.

The second substrate 40 includes a black matrix layer 41 corresponding to a region other than the pixel region, a stripe shaped color filter layer 42 corresponding to vertical pixel regions parallel with the data line, and a common electrode or an overcoat layer 43 formed on the color filter layer 42.

FIGS. 2A and 2B are a plan view and a sectional view illustrating a touch defect of the related art LCD device provided with a plurality of column spacers.

Referring to FIGS. 2A and 2B, when an LCD panel 10 provided with a plurality of column spacers is touched with a finger or other object, a spot is generated on the touched portion. This spot is referred to as a touch spot or touch defect because the spot is generated on the screen of the LCD panel.

As described above, the column spacers form a relatively large contact area with the substrates in an LCD device, compared with the ball spacers. As illustrated in FIG. 2B, such a large contact area between the column spacers 20 and its opposing first substrate 1 generates a frictional force when the LCD device is touched with a finger or other object, and the frictional force shifts the relative positions of the first and second substrates 1 and 2, creating the aforementioned touch defect. Once such a touch defect is created, it takes a long time for the LCD device to restore the original state of the first and second substrates 1 and 2. For this reason, the touch spot remains on the LCD screen until the first and second substrates 1 and 2 are restored to their original state.

The aforementioned related art LCD device provided with the column spacers has the following problems.

First, as described above, when the LCD device is touched with a finger or other object, the touch spot is created and remains on the LCD screen until the first and second substrates 1 and 2 are restored to their original state.

Second, when the LCD device is arranged in a vertical direction under a high temperature environment, liquid crystal inside the LCD device is thermally expanded. In the worst case, the cell gap of the LCD device increase to a thickness greater than the height of the column spacers, so that the liquid crystal flows into the space between the column spacers and its opposing substrate and are then concentrated on a lower corner of the LCD device arranged in a vertical direction, thereby causing an opaque spot.

Finally, in addition to the frictional force between the column spacers and its opposing substrate, the touch defect is generated when liquid crystal is not sufficiently provided inside the LCD device. By contrast, when liquid crystal is excessively provided inside the LCD device, a gravity defect is generated. Accordingly, it is important to provide a proper amount of liquid crystal to fabricate an LCD device free from the touch and gravity defects. Due to the structure of the related art LCD device, a range of amount of liquid crystal is limited in fabricating an LCD device free from the touch and gravity defects.

SUMMARY OF THE INVENTION

Accordingly, the present invention is directed to an LCD device and method for fabricating the same that substantially obviates one or more problems due to limitations and disadvantages of the related art.

An advantage of the present invention is to provide an LCD device and method for manufacturing the same that can improve the display quality.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display (LCD) device includes first and second substrates facing each other; a plurality of step portions on the first substrate; a plurality of first column spacers on the second substrate, the first column spacers contacting the step portions wherein an upper surface of the first column spacer is larger than a contact area between the first column spacer and the step portion; a plurality of second column spacers on the second substrate, the second column spacers spaced apart from the first substrate, wherein a first contact area between the first column spacers and the second substrate is smaller than a second contact area between the second column spacers and the second substrate; and a liquid crystal layer between the first and second substrates.

In another aspect of the present application, a method for fabricating a liquid crystal display (LCD) device includes providing first and second substrates; forming a plurality of step portions on the first substrate; forming a plurality of first column spacers and a plurality of second column spacers on the second substrate; providing a liquid crystal layer between the first and second substrates; and attaching the first and second substrates together, wherein the first column spacers contact the step portions, the second column spacers are spaced apart from the first substrate, and a first contact area between the first column spacers and the second substrate is smaller than a second contact area between the second column spacers and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A and 2B are a plane view and a sectional view illustrating a touch defect of the related art LCD device provided with a plurality of column spacers;

FIGS. 6A and 6B are plan views illustrating arrangements of the first column spacers in LCD devices according to the first embodiment of the present invention;

DETAILED DESCRIPTION OF THE ILLUSTRATED EMBODIMENT

Reference will now be made in detail to embodiments of the present invention, examples of which are illustrated in the accompanying drawings. Wherever possible, the same reference numbers will be used throughout the drawings to refer to the same or like parts.

Figure 1:
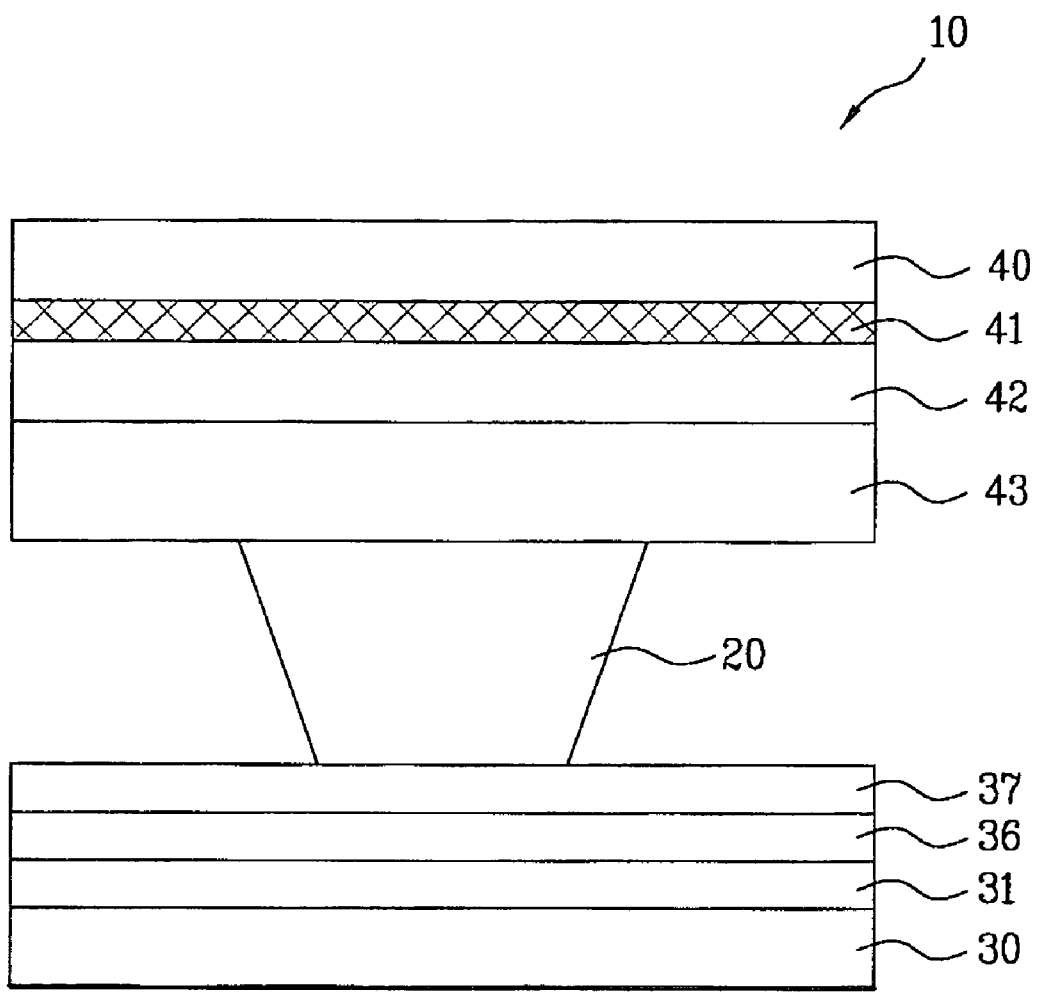
FIG. 1 is a sectional view illustrating an LCD device provided with a plurality of column spacers according to the related art.
Figure 2A:
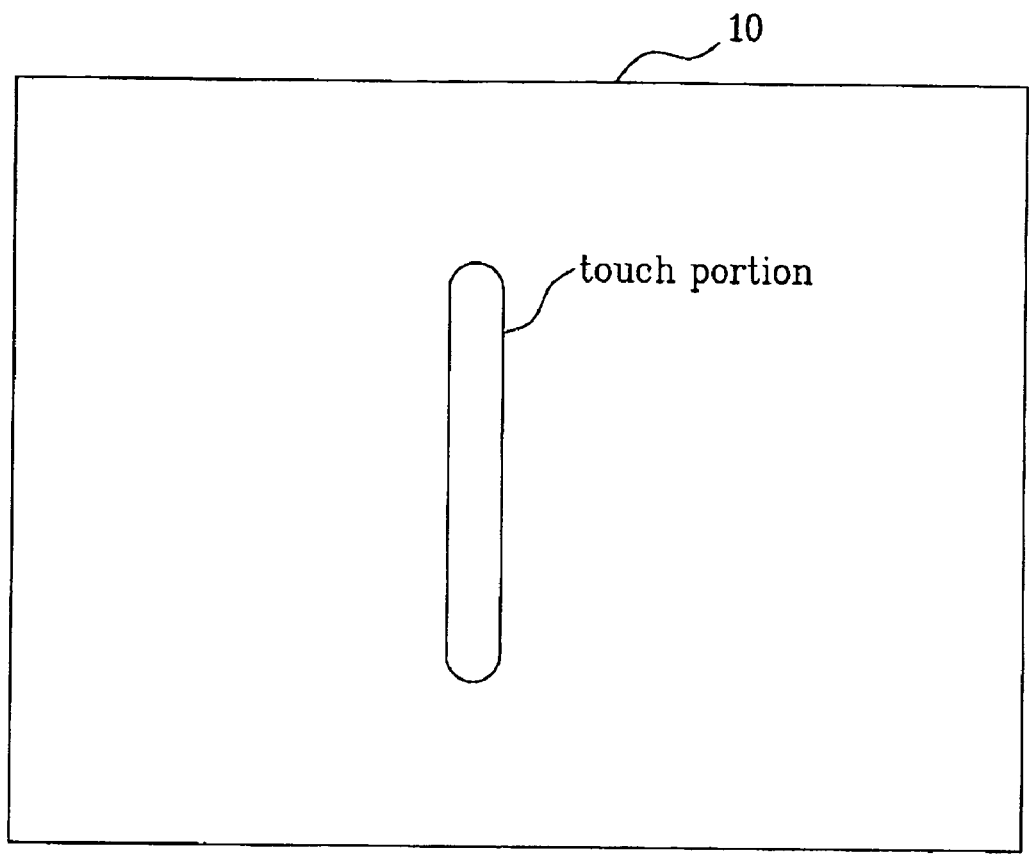
Figure 3:
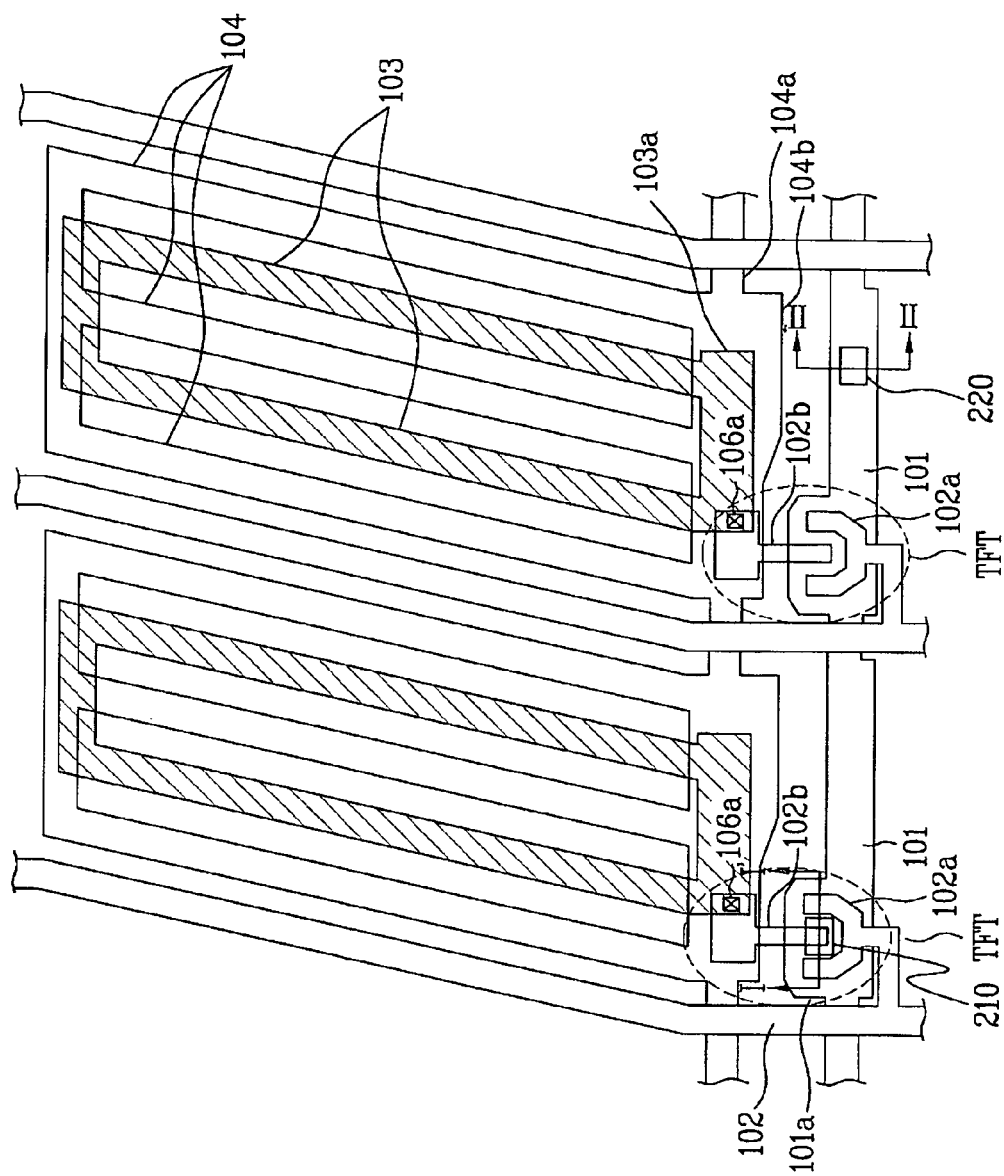
FIG. 3 is a plan view illustrating an LCD device according to the present invention.
Figure 4:
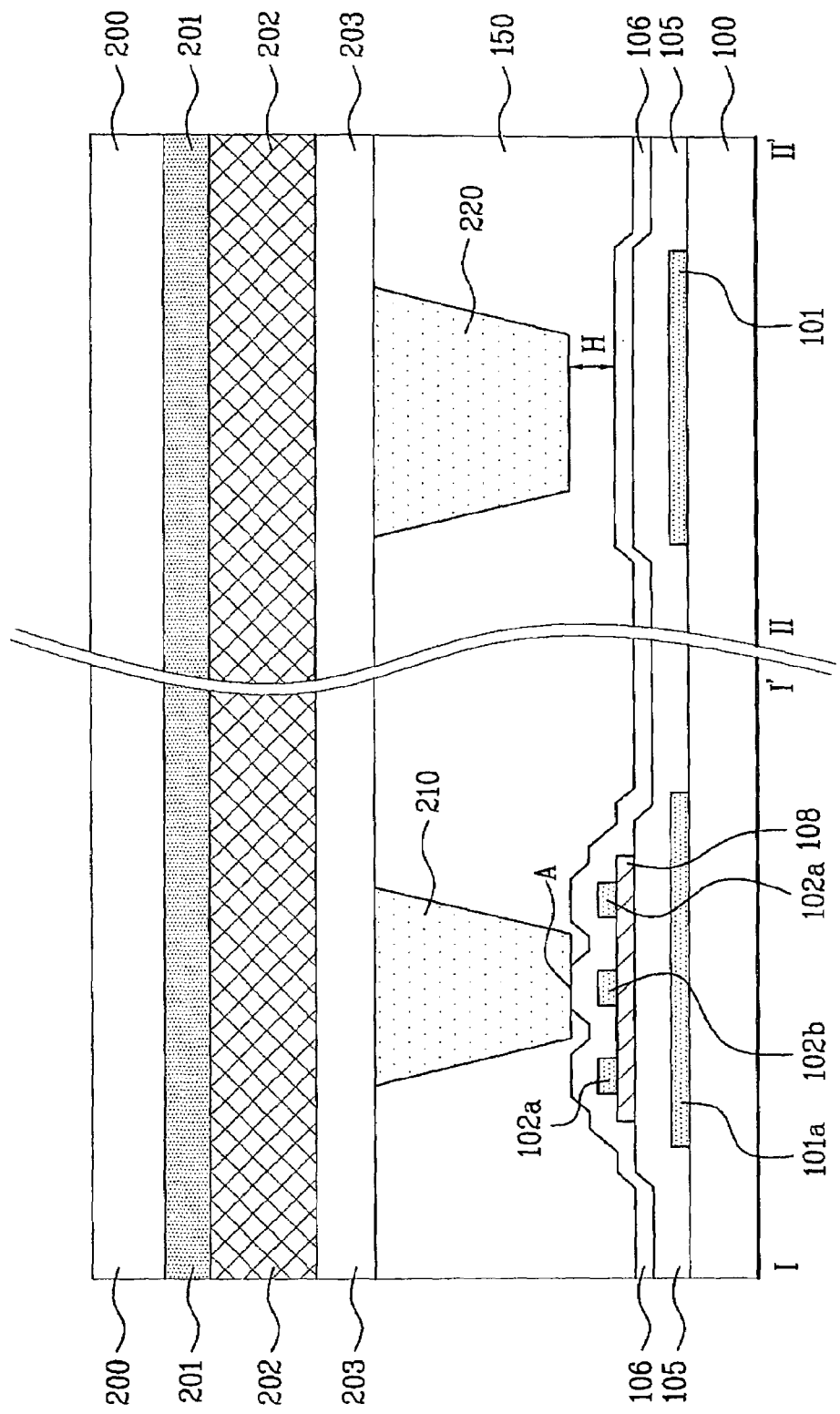
FIG. 4 is a sectional view taken along the lines I-I' and II-II' of FIG. 3.

FIG. 3 is a plan view illustrating an LCD device according to the present invention, and FIG. 4 is a sectional view taken along the lines I-I' and II-II' in FIG. 3.

Referring to FIG. 3, the LCD device includes first and second substrates 100 and 200 opposing each other, a step portion provided on the first substrate 1 00, a first column spacer 210 formed on the second substrate 200 to correspond to the step portion, and a second column spacer 220 formed on the second substrate 200 to correspond to other portions except the step portion. The step portion on the first substrate 100 may be formed by a thin film transistor (TFT), as illustrated in FIG. 3. Alternatively, a separate protrusion formed during the fabrication of the TFT on the first substrate 100 may be used for the step portion.

The step portion is provided with an upper portion that contacts the first column spacer 210 during the bonding process of the first and second substrates 100 and 200. The upper portion of the step portion has a smaller area than a corresponding portion of the first column spacer 210. When the first column spacer 210 is formed on the second substrate 200, the corresponding portion of the first column spacer 210 is an upper portion of the first column spacer 210.

Referring to FIG. 4, when the first and second substrates 100 and 200 are bonded together, the contact area between the first column spacer 210 and the first substrate 100 is limited to a contact area "A" and the second column spacer 220 is spaced apart from the first substrate 100 by a gap "H". Accordingly, when the LCD device is touched with a finger or other object, a contact area (or a frictional area) between the column spacer and the first substrate 100 is reduced and the generation of the touch defect can be minimized or prevented.

Furthermore, when an external pressure is locally applied to surfaces of the first and second substrates 100 and 200, the second column spacer 220 contacts the first substrate 100 to maintain a cell gap along with the first column spacer 210, so that a plastic deformation of the LCD device at a local area, which is referred to as a stamp defect or push defect, can be minimized or prevented.

Meanwhile, the thickness of the first column spacer 210 pushed during the bonding process is referred to as an elastic gap. It is known in the art that as the elastic gap becomes greater, the aforementioned gravity defect can be lowered. Thus, an LCD device with a greater elastic gap is beneficially used under a high temperature environment.

In the LCD device according to the present invention, the first column spacer 210 is in contact with the upper portion of the step portion, with the contact area "A". Because of the smaller contact area, a greater force is applied to the first column spacer 210 during the bonding process of the first and second substrates 100 and 200, thereby increasing the elastic gap and minimizing or preventing the liquid crystal from flowing downwardly and concentrating on a local area of the LCD device. Also, a ratio of the first column spacer 210 to the second column spacer 220 is relatively lower, thereby further increasing the elastic gap. Therefore, a first contact area between the first column spacers and the second substrate is smaller than a second contact area between the second column spacers and the second substrate.

Hereinafter, the LCD device according to the present invention will be described in more detail.

Referring back to FIGS. 3 and 4, the first substrate 100 includes gate and data lines 101 and 102 crossing each other to define pixel regions, TFTs formed adjacent to the crossings between the gate lines 101 and the data lines 102, first storage electrodes 103a electrically connected with drain electrodes 102b of the TFTs, pixel electrodes 103 and common electrodes 104 alternately forked from the first storage electrodes 103a and common lines 104a, and second storage electrodes 104b connected with the common lines 104a and the common electrodes 104 and overlapped with the first storage electrodes 103a. The pixel electrodes 103 and common electrodes 104 are formed in parallel with one another in the pixel regions to adjoin the gate lines 101.

Each TFT is defined in a region between a U-shaped source electrode 102a and each drain electrode 102b, and its channel region is formed between the two electrodes. Each TFT includes a gate electrode 101a extended from the gate line 101, the U-shaped source electrode 102a extended from the data line 102, and the drain electrode 102b spaced apart from the U-shaped source electrode 102a at a predetermined interval. The TFT further includes a semiconductor layer 108 formed below the data line 102, the source electrode 102a and the drain electrode 102b.

The semiconductor layer has a multi-layered structure of an amorphous silicon layer (not shown) and an n+layer (impurity layer) (not shown). The n+ layer is removed from the channel region. The semiconductor layer 108 may selectively be formed below the source and drain electrodes 102a and 102b. Also, the semiconductor layer may be formed below the data line 102. Although the present invention is described with an LCD device having a U-shaped channel, it should be understood that the principles of the present invention is applicable to other types of TFTs, including a TFT having a straight-line-shaped source electrode.

The gate lines 101, the common lines 104a and the common electrodes 104 are formed of a metal such as Mo, Cr, Cu, or the like. A gate insulating layer 105 is interposed between the gate line 101 and the semiconductor layer, and a passivation layer 106 is interposed between the data line 102 and the pixel electrode 103.

Each pixel region includes a storage capacitor having the second storage electrode 104b connected with the common line 104a, the first storage electrode 103a formed on the second storage electrode 104b, and the gate insulating layer 105 and the passivation layer 106 interposed between the two electrodes.

The drain electrode 102b contacts the first storage electrode 103a through a contact hole 106a formed in the passivation layer 106 at a predetermined portion of the drain electrode 102b.

The second substrate 200 includes a black matrix layer 201 for preventing a light leakage from portions of the first substrate 100 except at the pixel regions, a color filter layer 202 for displaying various colors, and an overcoat layer 203 formed on an entire surface of the second substrate 200.

The first column spacer 210 is formed above the overcoat layer 203 to correspond to a center portion of the TFT on the first substrate 100, and the second column spacer 220 is formed to correspond to a predetermined portion of either the gate line 101 or the data line 102. The first column spacer 210 and the second spacer 220 are made of organic resin, e.g. photoreactive resin. The first column spacer 210 is in contact with the upper portion of the passivation layer 106 above the center portion of the TFT on the first substrate 100, and the second column spacer 220 is spaced apart from the upper portion of the passivation layer 106 above the gate line 101 by a predetermined gap "H". Also, the first and second column spacers 210 and 220 on the overcoat layer 203 correspond to an upper portion of the black matrix layer 210.

As described above, the LCD device according to the present invention has a predetermined ratio of the first column spacers 210 to the second column spacers 220, wherein the first column spacers 210 maintain the cell gap between the first and second substrates 100 and 200 and the second column spacers 220 are spaced apart from the first substrate 100 by the gap "H" and minimizes or prevents the push defect.

Hereinafter, a margin of liquid crystal according to the arrangement ratio of the first column spacer to the second column spacer will be described. The margin of liquid crystal is defined as a range of amount of liquid crystal in fabricating an LCD device substantially free from the gravity and touch defects.

Figure 5:
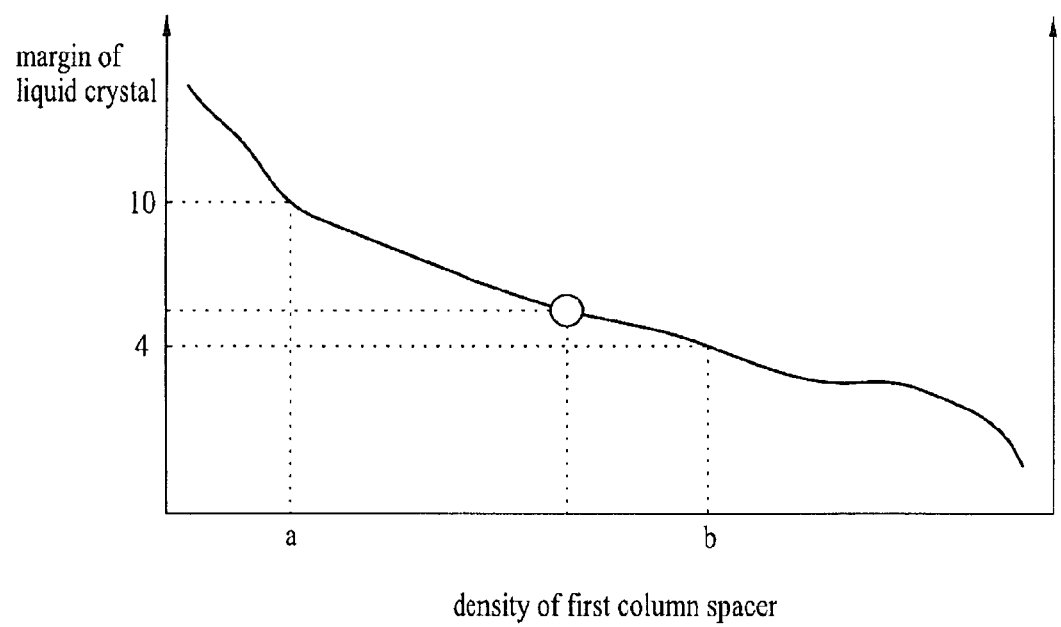
FIG. 5 is a graph showing the relationship between the margin of liquid crystal and the density of the first column spacers.

FIG. 5 is a graph showing the relationship between the margin of liquid crystal and the density of the first column spacers.

Referring to FIG. 5, the margin of liquid crystal increases as the density of the first column spacers decreases. In the LCD device according to the present invention, the first column spacers 210 for maintaining the cell gap have a smaller contact area "A" with the first substrate, meaning that the density of the first column spacers is small and a greater force is applied to the first column spacers during the bonding process of the first and second substrates 100 and 200. As a result, the margin of liquid crystal increases due to the high elastic gap that is inversely proportional to the contact area.

However, if the density of the first column spacers becomes too small, the first column spacers may fail to maintain the cell gap. Accordingly, the density of the first column spacers should be maintained at a predetermined value "a" or greater. Also, the margin of liquid crystal should be greater than 4 dots (corresponding to the density of the first column spacer "b") in consideration of the error ranges of the LCD device and liquid crystal dispensing equipment. For example, the point "O" between the densities of the first column spacer "a" and "b" shown in FIG. 5 represents a proper density of the first column spacers. The LCD device used in these experiments is a wide-type 20.1" LCD device and the quantity of one dot of liquid crystal is 4 mg. Therefore, the margin of liquid crystal is 16-40 mg in this LCD device. If the size of the liquid crystal panel becomes larger, the margin of liquid crystal also becomes greater. As the total quantity of liquid crystal increases, the influence of quantity of one dot becomes relatively small.

When a ratio of the contact area between the first column spacers 210 and the step portions (TFT or protrusion) with respect to the total area of the second substrate 200 is 30 ppm to 150 ppm (in this case, ppm is equal to $10^{-6}$), the margin of liquid crystal is in the range of 4 to 10 dots, which can minimize or prevent the gravity and touch defects.

Figure 6B:
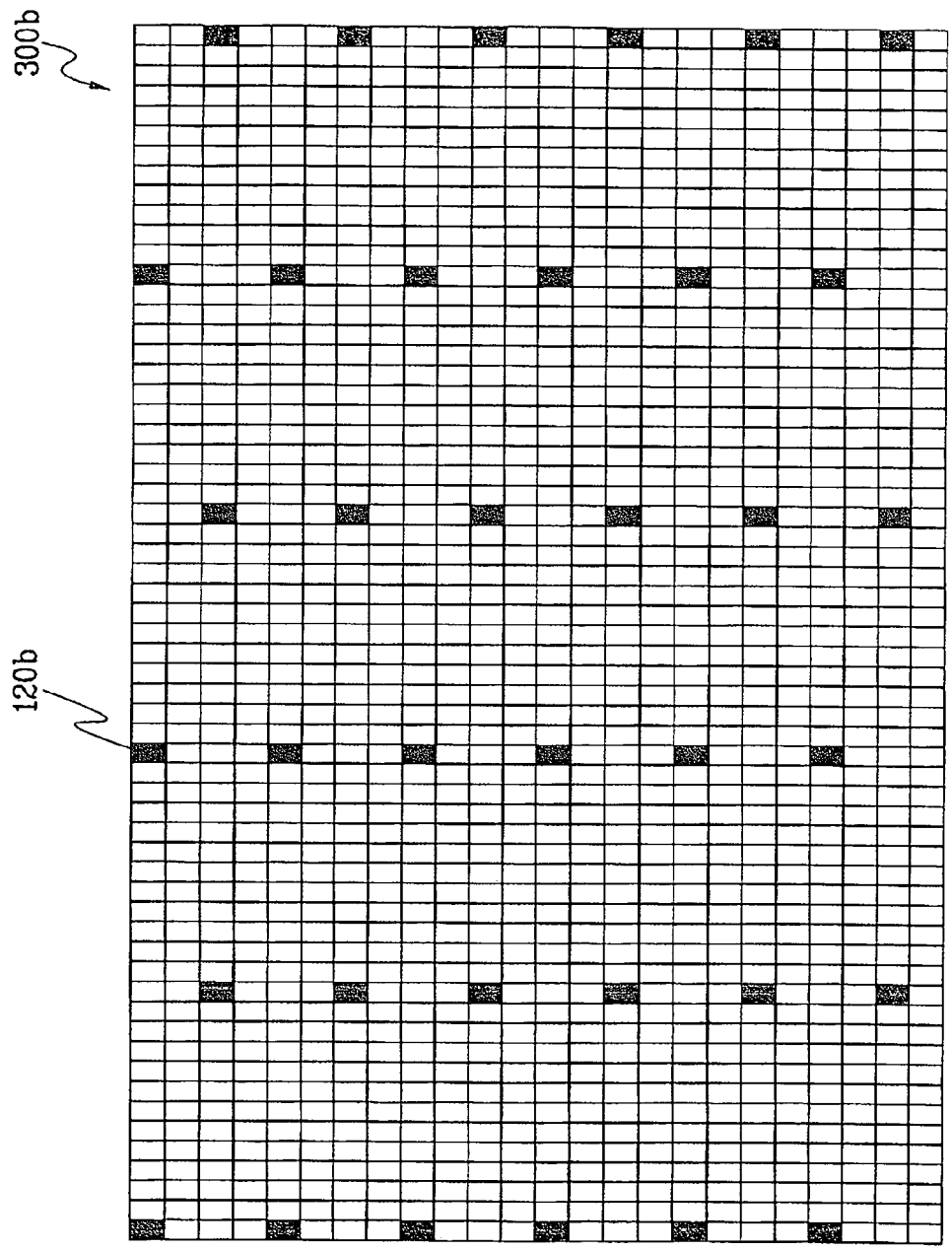
Figure 7:
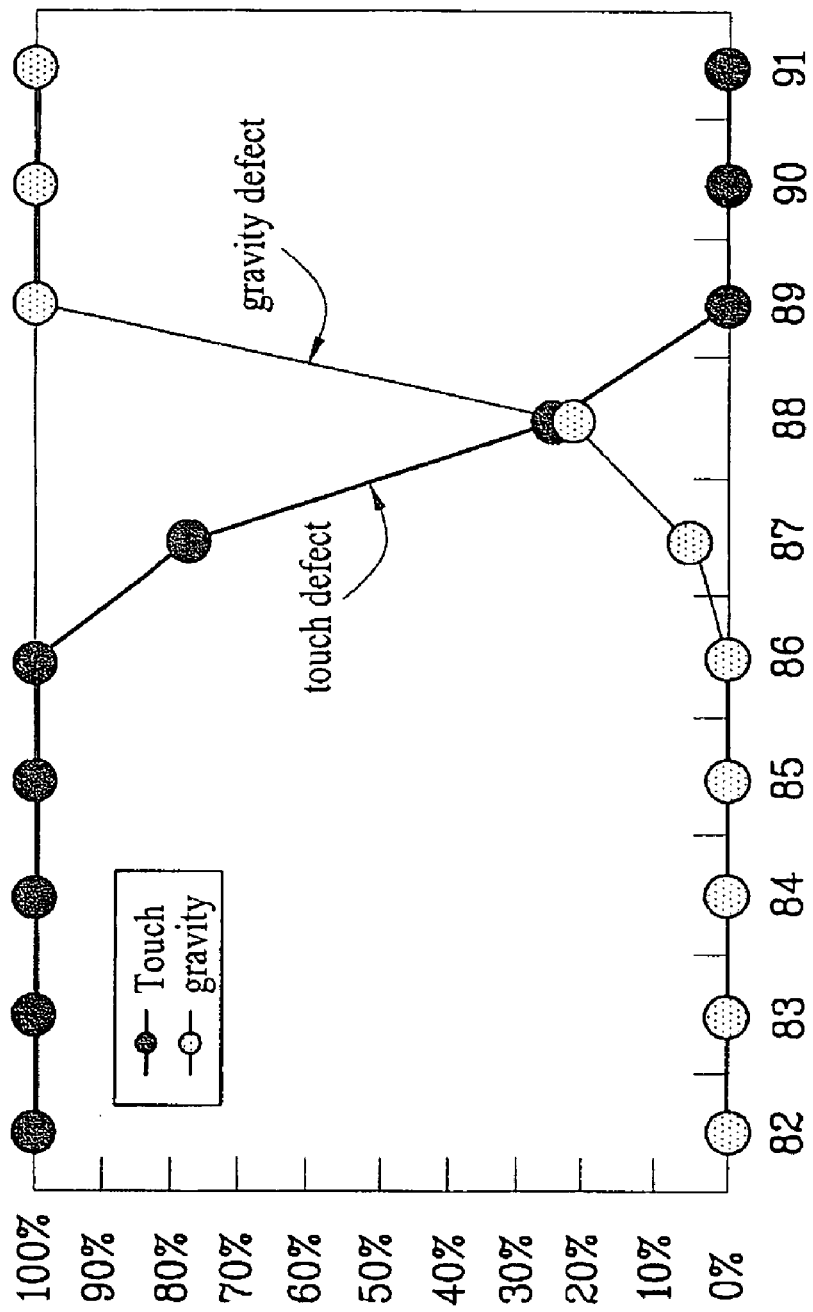
FIG. 7 is a graph showing the relationship between the amount of liquid crystal and the percentages of the gravity and touch defects of the LCD device illustrated in FIG. 6A.
Figure 8:
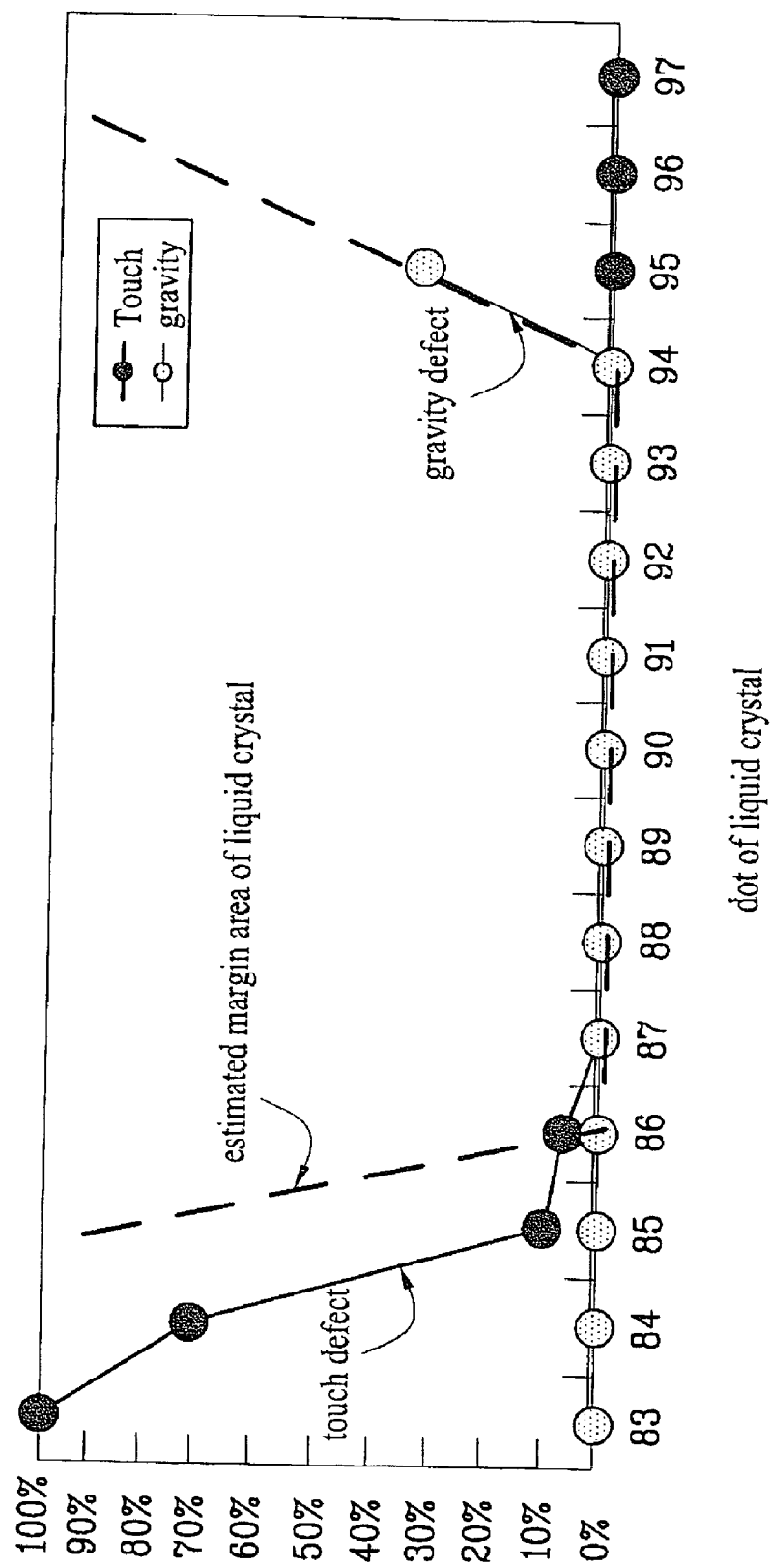
FIG. 8 is a graph showing the relationship between the amount of liquid crystal and the percentages of the gravity and touch defects of the LCD device illustrated in FIG. 6B.

FIGS. 6A and 6B are plan views illustrating arrangements of the first column spacers in LCD devices according to the first embodiment of the present invention, FIG. 7 is a graph showing the relationship between the amount of liquid crystal and the percentages of the gravity and touch defects of the LCD device illustrated in FIG. 6A and FIG. 8 is a graph showing the relationship between the amount of liquid crystal and the percentages of the gravity and touch defects of the LCD device illustrated in FIG. 6B.

Referring to FIGS. 6A, 6B, 7 and 8, the LCD device 300a includes one first column spacer arranged per 12 pixels and the LCD device 300b includes one first column spacer arranged per 48 pixels. Black portions 120a and 120b represent pixels where the first column spacers 210 are formed. As described above, the first column spacers 210 are formed either on the center portion of the TFT or on the protrusion in the pixel region 120a or 120b.

In the LCD device 300a of FIG. 6A having one first column spacer 210 arranged per 12 pixels, a ratio of the contact area (contact area ratio) between the first column spacers 210 and the step portions is in the range of 190 ppm or greater with respect to the total area of the second substrate (200 of FIG. 4) where the first and second column spacers are formed. As shown in FIG. 7, the gravity defect occurs when the amount of liquid crystal is greater than 86 dots and the touch defect occurs when the amount of liquid crystal is less than 89 dots. Accordingly, a range of an amount of liquid crystal that can prevent both the touch defect and the gravity defect does not exist. In other words, the margin of liquid crystal is 0 dot (0 mg), making it difficult to fabricate an LCD device free from both the touch defect and the gravity defect.

By contrast, in the LCD device 300b of FIG. 6B having one first column spacer 210 arranged per 48 pixels, a ratio of the contact area (contact area ratio) between the first column spacers 210 and the step portions is in the range of 60 ppm. As shown in FIG. 8, the gravity defect occurs when the amount of liquid crystal is greater than 94 dots and the touch defect occurs when the amount of liquid crystal is less than 87 dots. Assuming that an allowable range of the defects is within 10%, the amount of liquid crystal, which can prevent both the gravity defect and the touch defect, will be in the range of 86 dots to 94 dots. Accordingly, the margin of liquid crystal ranges over a total of 8 dots (32 mg).

Compared with the LCD device of FIG. 6A, the LCD device of FIG. 6B is improved in terms of the touch defect, because the contact area ratio between the first column spacers 210 and the step portions (protrusions or TFTs) is reduced from 190 ppm to 60 ppm. Also, the LCD device of FIG. 6B is improved in terms of the gravity defect, because the arrangement ratio of the first column spacers 210 to the total pixels of the second substrate 200 is reduced from 1/12 to 1/48, which then increases the pressure applied to the first column spacers 210 and the elastic gap. In both LCD devices of FIGS. 6A and 6B, the arrangement ratios of the second column spacers 220 to the total pixels of the second substrate 200 are the same.

In the LCD device according to the first embodiment of the present invention, the second column spacers 220 are formed on the second substrate 200 corresponding to the gate line 101 or the date line 102 to prevent the push defect. The second column spacers 220 are spaced apart from the uppermost surface of the first substrate 100 and maintain the cell gap along with the first column spacer 210 when an external pressure is locally applied to the LCD device.

In the LCD device illustrated in FIG. 6B, the contact area ratio of the second column spacers 220 is in the range of about 5,000 ppm (0.5%) with respect to the total area of the second substrate 200. However, according to the principles of the present invention, the contact area ratio of the second column spacer may be in the range of about 2,500 ppm to about 10,000 ppm (0.25 to 1%) to obtain the same or similar effects. In either case, the contact area between the first column spacers 210 and the second substrate 200 is smaller than the contact area between the second column spacers 220 and the second substrate 200. The shapes of the contact area between the first column spacers 210 and the second substrate 200 and the shape of the contact area between the second column spacers 220 and the second substrate 200 may have a circular, polygonal or other shapes.

As described above, although the margin of liquid crystal greater than 0 can prevent both the touch defect and the gravity defect, it beneficially has a value of 4 dots to 10 dots, considering the error ranges of both the LCD device and liquid crystal dispensing equipment. Accordingly, the contact area ratio between the first column spacers and the step portions should be in the range of about 30 ppm to about 150 ppm, and the contact area ratio of the second column spacers should be in the range of about 2500 ppm to about 10000 ppm.

Figure 9:
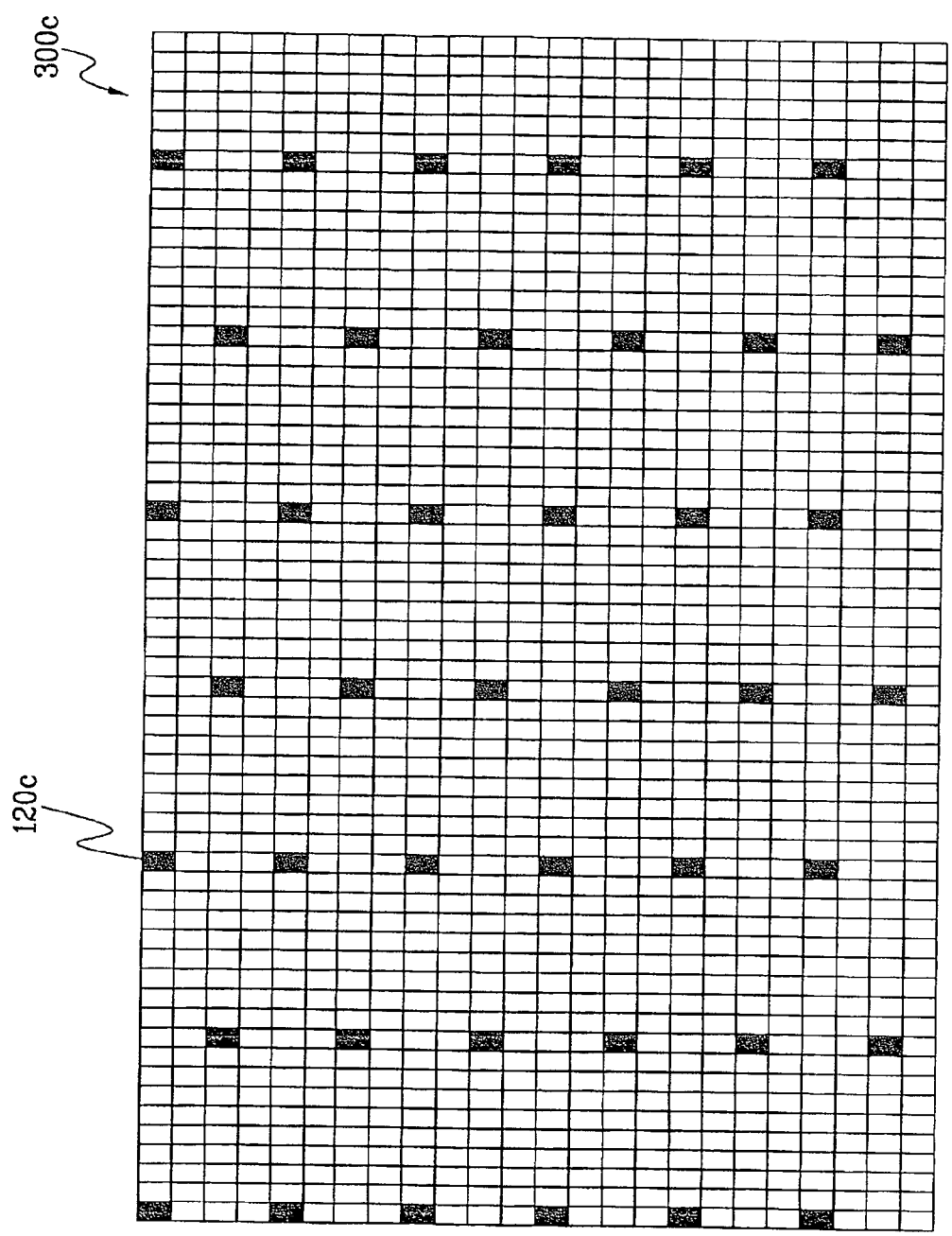
FIG. 9 is a plan view illustrating an arrangement of the first column spacers in an LCD device according to the second embodiment of the present invention.

FIG. 9 is a plan view illustrating an arrangement of the first column spacers in and LCD device according to the second embodiment of the present invention.

Referring to FIG. 9, the LCD device 300c has the same number and the same arrangement of the second column spacers as the LCD devices of the first embodiment, but the arrangement ratio of the first column spacers 210 to the total pixels of the second substrate 200 is 1/36, which is 3/2 times arrangement ratio of the first embodiment (1/48). Also, each contact area between the first column spacers 210 and the step portions is the same as that of the first embodiment.

In the second embodiment of the present invention, one first column spacer 210 is arranged in 36 pixels. The first column spacer 210 may be formed either on the center portion (for example, channel portion) of the TFT or on the protrusion formed on the gate line in the pixel region 120c. In this case, the contact area ratio between the first column spacers 210 and the TFTs or the protrusions is in the range of 80 ppm to 100 ppm. The margin of liquid crystal may be smaller than that of the first embodiment, but may be in the range of 4 dots to 10 dots (16 mg~40 mg).

Figure 10:
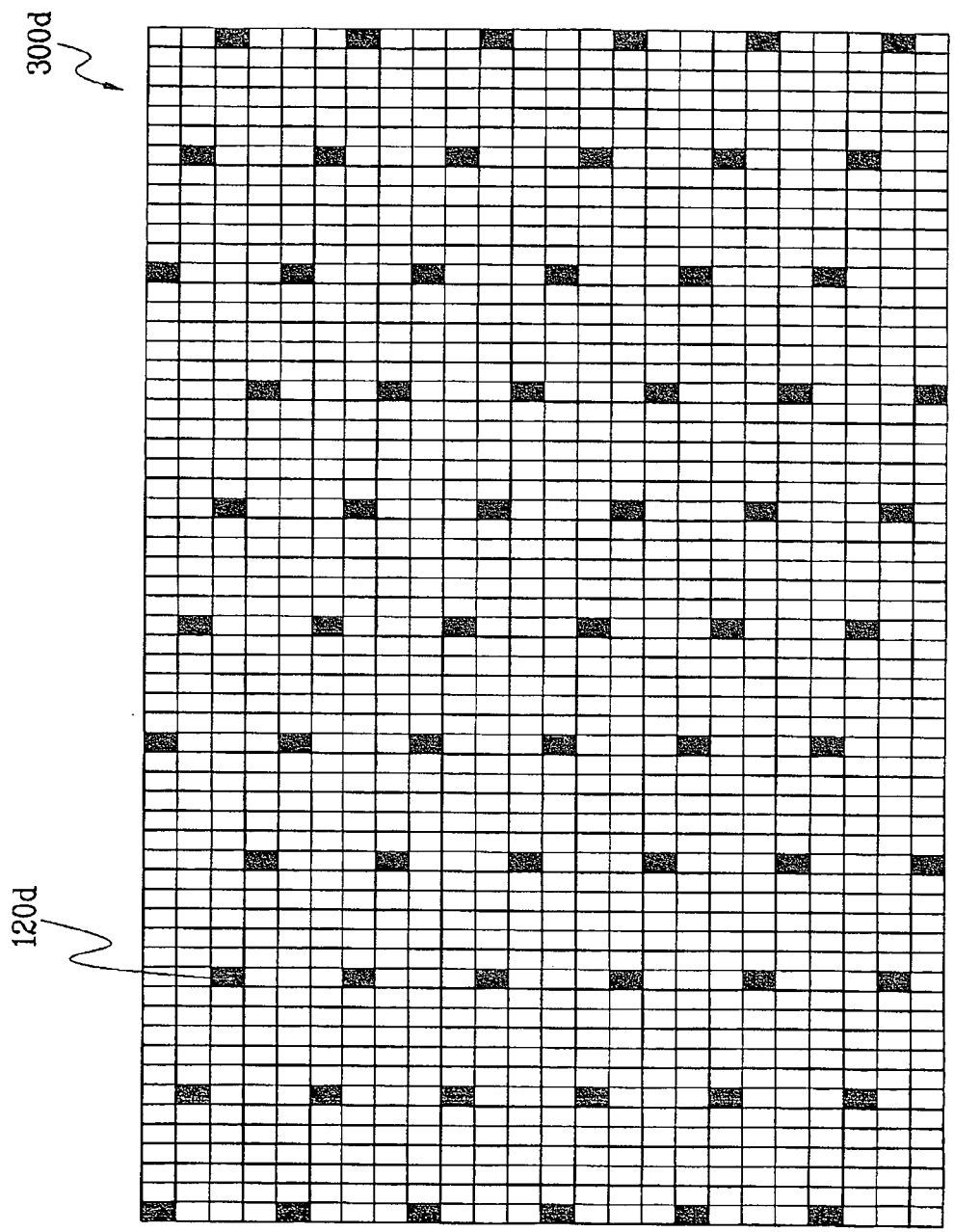
FIG. 10 is a plan view illustrating an arrangement of the first column spacers in an LCD device according to the third embodiment of the present invention.

FIG. 10 is a plan view illustrating an arrangement of the first column spacers of an LCD device according to the third embodiment of the present invention.

Referring to FIG. 10, the LCD device 300d has the same number and the same arrangement of the second column spacers as the LCD devices of the first embodiment, but the arrangement ratio of the first column spacer is 1/24, which is twice the arrangement ratio of the first embodiment (1/48). Also, each contact area between the first column spacers 210 and the step portions is the same as that of the first embodiment.

In the third embodiment of the present invention, one first column spacer 210 is arranged in 24 pixels. The first column spacer 210 may be formed either on the center portion (for example, channel portion) of the TFT or the protrusion formed on the gate line in the pixel region 120d. In this case, the contact area ratio between the first column spacers 210 and the TFTs or the protrusions is in the range of 110 ppm to 150 ppm. The margin of the liquid crystal may be smaller than that of the first embodiment, but is in the range of 4 dots to 10 dots.

The contact area ratio between the first column spacer and the step portion is not exactly proportional to the arrangement ratio of the first column spacers. Assuming that the contact area ratio between the first column spacers and the step portions is 1 when the arrangement ratio of the first column spacers is 1/48, the contact area ratio is 3/2 when the arrangement ratio is 1/36, but the contact area ratio is not 2 when the arrangement ratio is 1/24. This is because when the arrangement ratio is 1/48, an additional pressure is applied to the contact area between the first column spacers and the step portions during the bonding process.

Figure 11A:
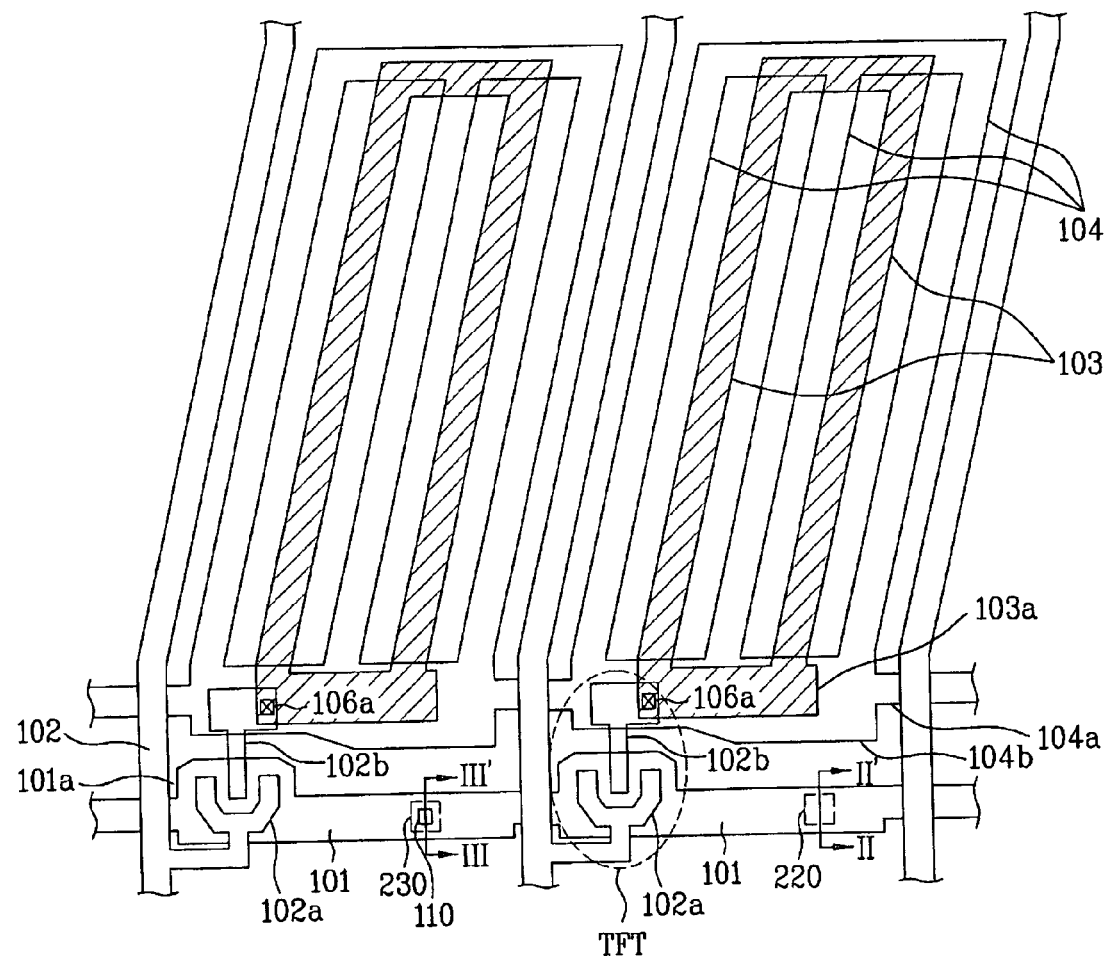
FIG. 11A and FIG. 11b is a plan view and a sectional view illustrating another LCD device according to the present invention, respectively.
Figure 11B:
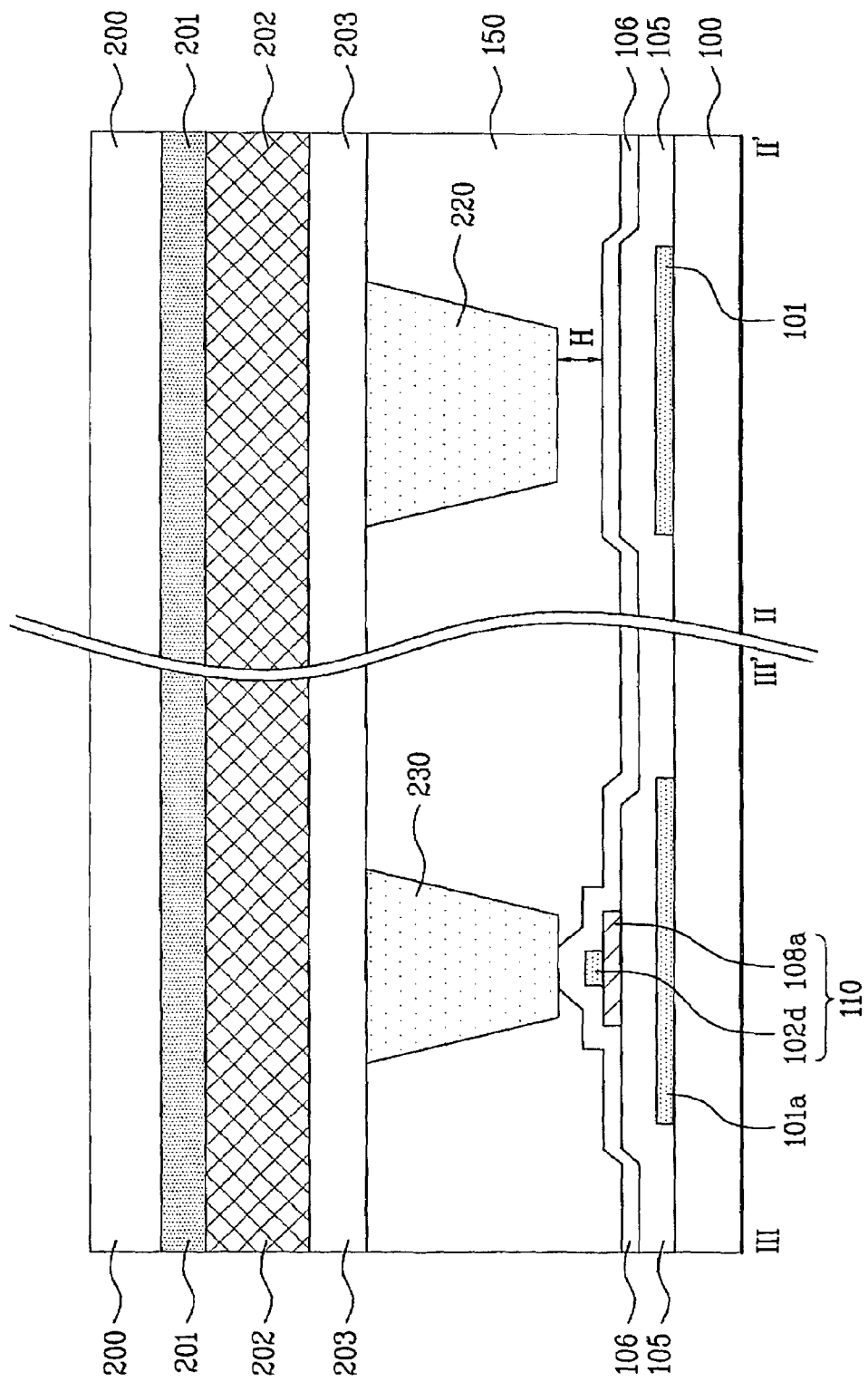

FIG. 11A and FIG. 11b is a plan view and a sectional view illustrating another LCD device according to the present invention, respectively.

Referring to FIG. 11A and FIG. 11B, the step portion on the first substrate 100 may be formed by a separate protrusion 110 formed with a laminated structure including a semiconductor layer pattern 108a, which is the same layer of the semiconductor layer 108 (FIG. 3) and a source/drain metal layer pattern 102d, which is the same layer of the source/drain electrode 102a/102b, on the gate line 101 or common line 104a. The protrusion 110 is formed on the gate line 101. In another cases, the protrusion 110 may be formed with the same layer of the gate line 101 below the data line 102.

In the LCD device according to the present invention, the contact area ratio between the first column spacers and the step portions is in the range of about 30 ppm to about 150 ppm, and the contact area ratio of the second column spacer corresponding to the second substrate is in the range of about 2500 ppm to about 10000 ppm (0.25% to 1.0%). In this case, the margin of liquid crystal is in the wide range of about 4 dots to about 10 dots (about 16 mg~40 mg) that can prevent the touch and gravity defects.

Although the principles of the present invention is explained with the aforementioned examples, it should be understood that various modifications and variation can be made in the present invention. For example, when the contact area between the first column spacers and the step portions (TFTs and protrusions) is relatively great, the arrangement ratio may be smaller than 1/48. Also, when the contact area between the first column spacers and the step portions is relatively small, the arrangement ratio may be greater than 1/12. Beneficially, each of the first column spacers may be arranged in every 6 to 96 pixel regions.

In either case, the margin of liquid crystal is in the range of 4 dots to 10 dots, the contact area ratio of the first column spacers is in the range of 30 ppm to 150 ppm, and the number and the arrangement ratio of the second column spacers are greater than those of the first column spacers. In this way, the first and second column spacers are arranged at constant intervals.

As described above, the LCD device according to the present invention has the following advantages. First, because the contact area ratio between the column spacers and the step portions with respect to the total area of the second substrate is reduced from 190 ppm to 30 ppm-150 ppm, it is possible to minimize or prevent the touch defect. Second, because of the high elastic gap, it is possible to minimize or prevent the gravity defect. Finally, because of the second column spacers spaced apart from the first substrate, it is possible to minimize or prevent the push defect.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device comprising:
    first and second substrates facing each other;
    a plurality of step portions on the first substrate;
    a plurality of first column spacers on the second substrate, each first column spacer contacting each step portion, wherein an opposing surface of each first column spacer is larger than a contact area between each first column spacer and each step portion and the opposing surface of the first column spacer is the surface of the first column spacer contacting the step portion;
    a plurality of second column spacers on the second substrate, the second column spacers spaced apart from the first substrate, wherein a first contact area between the plurality of the first column spacers and the second substrate is smaller than a second contact area between the plurality of second column spacers and the second substrate; and
    a liquid crystal layer between the first and second substrates.

2. The LCD device as claimed in claim 1, wherein a contact area ratio between the first column spacers and the step portions with respect to a total area of the second substrate is in a range of about 30 ppm to about 150 ppm.

3. The LCD device as claimed in claim 1, wherein a contact area ratio of the second column spacers with respect to a total area of the second substrate is in a range of about 2,500 ppm to about 10,000 ppm.

4. The LCD device as claimed in claim 1, wherein the number of the second column spacers is about 16.7 times to about 333 times the number of the first column spacers.

5. The LCD device as claimed in claim 1, further comprising:
    gate and data lines on the first substrate to define pixel regions, the gate lines crossing the data lines; and
    pixel electrodes in the pixel regions.

6. The LCD device as claimed in claim 5, wherein the step portion is adjacent to each crossing of the gate lines and the data lines.

7. The LCD device as claimed in claim 6, wherein the step portion is formed on a channel area of a thin film transistor in each pixel region.

8. The LCD device as claimed in claim 5, wherein the step portions are formed on either the gate lines or the data lines.

9. The LCD device as claimed in claim 5, wherein the second column spacers are formed on either the gate lines or the data lines.

10. The LCD device as claimed in claim 5, further comprising:
a black matrix layer on the second substrate; and
a color filter layer on the second substrate, the color filter layer corresponding to the pixel regions.

11. The LCD device as claimed in claim 10, wherein the first and second column spacers are formed over the black matrix layer.

12. The LCD device as claimed in claim 5, wherein each of the first column spacers is arranged in every 6 to 96 pixel regions.

13. A method for fabricating a liquid crystal display (LCD) device, the method comprising:
providing first and second substrates;
forming a plurality of step portions on the first substrate;
forming a plurality of first column spacers and a plurality of second column spacers on the second substrate;
providing a liquid crystal layer between the first and second substrates; and
attaching the first and second substrates together, wherein each first column spacer contact each step portion, the second column spacers are spaced apart from the first substrate, and a first contact area between the plurality of the first column spacers and the second substrate is smaller than a second contact area between the plurality of the second column spacers and the second substrate, and
wherein an opposing surface of each first column spacer is larger than a contact area between each first column spacer and each step portion, and the opposing surface of the first column spacer is the surface of the first column spacer contacting the step portion.

14. The method as claimed in claim 13, wherein a contact area ratio between the first column spacers and the step portions with respect to a total area of the second substrate is in a range of about 30 ppm to about 150 ppm.

15. The method as claimed in claim 13, wherein a contact area ratio of the second column spacers with respect to a total area of the second substrate is in a range of about 2,500 ppm to about 10,000 ppm.

16. The method as claimed in claim 13, wherein the number of the first column spacers is about 16.7 times to about 333 times the number of the second column spacers.

17. The method as claimed in claim 13, wherein the step portion is formed on a channel area of a thin film transistor in each pixel region.

18. The method as claimed in claim 13, wherein one of the step portions is formed on a metal line.

19. The method as claimed in claim 13, wherein the first and second column spacers are formed over a black matrix layer on the second substrate.

20. The method as claimed in claim 13, wherein each of the first column spacers is arranged in every 6 to 96 pixel regions defined by gate lines and data lines.

* * * * *